United States Patent
Kim et al.

(10) Patent No.: US 9,988,752 B2
(45) Date of Patent: Jun. 5, 2018

(54) WASHING MACHINE MOTOR AND WASHING MACHINE COMPRISING SAME

(71) Applicant: AMOTECH CO., LTD., Incheon (KR)

(72) Inventors: Byung Soo Kim, Anyang-si (KR); Hyung Hwan Ko, Anseong-si (KR)

(73) Assignee: AMOTECH CO., LTD., Incheon (KR)

( * ) Notice: Subject to any disclaimer, the term of this patent is extended or adjusted under 35 U.S.C. 154(b) by 255 days.

(21) Appl. No.: 14/902,672

(22) PCT Filed: Jul. 18, 2014

(86) PCT No.: PCT/KR2014/006548
§ 371 (c)(1),
(2) Date: Jan. 4, 2016

(87) PCT Pub. No.: WO2015/009104
PCT Pub. Date: Jan. 22, 2015

(65) Prior Publication Data
US 2016/0168775 A1 Jun. 16, 2016

(30) Foreign Application Priority Data

Jul. 19, 2013 (KR) .................. 10-2013-0085532
Oct. 2, 2013 (KR) .................. 10-2013-0118046

(51) Int. Cl.
*H02K 7/00* (2006.01)
*H02K 1/22* (2006.01)
(Continued)

(52) U.S. Cl.
CPC ............ *D06F 37/304* (2013.01); *D06F 37/40* (2013.01); *H02K 1/148* (2013.01); *H02K 3/522* (2013.01);
(Continued)

(58) Field of Classification Search
CPC ................................. H02K 16/00; D06F 37/30
(Continued)

(56) References Cited

U.S. PATENT DOCUMENTS

| | | | | |
|---|---|---|---|---|
| 4,232,536 A | * | 11/1980 | Koseki | .................... D06F 13/02 68/12.16 |
| 6,257,027 B1 | * | 7/2001 | Imai | ..................... D06F 37/304 68/12.12 |
| 2013/0160499 A1 | * | 6/2013 | Kim | .................... A47L 15/0018 68/12.16 |

FOREIGN PATENT DOCUMENTS

JP 59200695 A * 11/1984
KR 20040071406 8/2004
(Continued)

OTHER PUBLICATIONS

International Search Report—PCT/KR2014/006548 dated Nov. 27, 2014.

*Primary Examiner* — Jose Gonzalez Quinone
(74) *Attorney, Agent, or Firm* — Cantor Colburn LLP (57) ABSTRACT

Provided are a washing machine motor including: an outer shaft connected to a washing tub; an inner shaft rotatably disposed inside the outer shaft and connected to a pulsator; an inner rotor connected to the outer shaft; an outer rotor connected to the inner shaft; a stator disposed between the inner rotor and the outer rotor with an air gap; and a planetary gear setmounted on the inner shaft so as to reduce a rotational speed. The washing machine motor includes the planetary gear set which increases a torque by reducing a rotational speed in the inner shaft connected to the pulsator to thereby allow implementation of a large-capacity washing machine.

15 Claims, 8 Drawing Sheets

(51) Int. Cl.
   *D06F 39/02*      (2006.01)
   *D06F 37/30*      (2006.01)
   *D06F 37/40*      (2006.01)
   *H02K 3/52*       (2006.01)
   *H02K 5/16*       (2006.01)
   *H02K 7/116*      (2006.01)
   *H02K 21/16*      (2006.01)
   *H02K 21/22*      (2006.01)
   *H02K 1/14*       (2006.01)
   *H02K 16/00*      (2006.01)
   *H02K 16/02*      (2006.01)

(52) U.S. Cl.
   CPC .............. *H02K 5/16* (2013.01); *H02K 7/116* (2013.01); *H02K 16/00* (2013.01); *H02K 16/02* (2013.01); *H02K 21/16* (2013.01); *H02K 21/222* (2013.01)

(58) Field of Classification Search
   USPC ............ 310/67 R, 156.26, 265, 266; 68/3 R, 68/13 R
   See application file for complete search history.

(56) References Cited

FOREIGN PATENT DOCUMENTS

| | | | |
|---|---|---|---|
| KR | 100548310 | 2/2006 | |
| KR | 20080092023 | 10/2008 | |
| KR | 20110012365 | 2/2011 | |
| KR | 20120136081 | 12/2012 | |
| WO | WO 2008123735 A1 * | 10/2008 | ........... D06F 37/304 |

\* cited by examiner

WASHING MACHINE MOTOR AND WASHING MACHINE COMPRISING SAME

TECHNICAL FIELD

The present invention relates to a washing machine motor that can drive a washing tub and a pulsator independently, and a washing machine using the same.

BACKGROUND ART

As disclosed in Korean Patent Registration Publication No. 10-0548310 (Jan. 24, 2006), the conventional washing machine includes: an outer case forming an outer shape; an outer tub which is supported on an inside of the outer case and receives wash water therein; an inner tub which is rotatably accommodated in an inside of the outer tub and is used for both washing and dehydrating; a pulsator which is mounted in an inside of the inner tub relatively rotatably, to form a washing water flow; a drive motorfor generating a driving force for rotating the inner tub and the pulsator; an inner tub rotating shaft which receives the driving force of the drive motor for rotating the inner tub; a pulsator rotating shaft which receives the driving force of the drive motor for rotating the pulsator; a sun gear which is connected to the drive motor and is connected to the pulsator rotating shaft; a plurality of planetary gears which are simultaneously engaged with both the sun gear and a ring gear; a carrier supporting the planetary gears so as to be rotated and revolved; and a clutch spring for controlling the rotation of the inner tub and the pulsator during washing or dehydrating.

The conventional washing machine has a planetary gear unit including the sun gear, the ring gear, the planetary gears and the carrier, and reduces the rotating force of the drive motor, to then be transferred to the pulsator and the inner tub, and operates the clutch spring to selectively transmit power to the pulsator and the inner tub, to thus rotate only the pulsator or both the pulsator and the inner tub in an identical direction simultaneously.

However, the conventional washing machineadopts the washing machine motor that provides a mono-power while having a single rotor-single stator structure, and thus needs the planetary gear unit and the clutch in order to selectively rotate the pulsator and the inner tub, to accordingly cause the configuration of the conventional washing machine to be complicated and the production cost thereof to increase.

Further, since the conventional washing machine is configured to have the planetary gear unit and the clutch spring between the drive motor and the outer tub, the space occupied in the height direction of the washing machine is increased and thus the height of the washing machine increases. Otherwise, since the height of the inner tub should be reduced in an identical height of the washing machine, there is a problem that a washing capacity is reduced.

Furthermore, when the pulsator rotating shaft is rotated in only one direction where the clutch spring is compressed upon dehydration of the conventional washing machine, the clutch spring is tightened to the outer peripheral surfaces of a first clutch drum and a second clutchdrum, whereby the pulsator rotating shaft and the inner tub rotating shaft are integrally rotated in an identical direction at an identical speed by the tension of the clutch spring. In this case, conventionally, a bearing rotatable only in one direction is used as a bearing for supporting the planetary gear set.

As a result, since the conventional washing machine has a structure that the pulsator and the inner tub can be rotated only in an identical direction, but cannot be rotated in opposite directions to each other, there is a problem that a variety of wash water flows cannot be formed and there is a limit to improve performance of the washing machine.

Technical Problem

To solve the above problems or defects, it is an object of the present invention to provide a washing machine motor that provides a dual-power while having a double rotor-double stator structure, to thereby independently drive a pulsator and a washing tub, respectively, and eliminate the conventional clutch apparatus to thus simplify the structure of washing machine motor and to thereby enable the pulsator and the washing tub to be mutually reversely driven, and a washing machine having the same.

It is another object of the present invention to provide a washing machine motor independently driving a pulsator and a washing tub, respectively, and setting a planetary gear set to be rotatable in two-way directions, to thereby enable dual-power and mono-power implementations and form a variety of water flow patterns, and a washing machine having the same.

It is stillanother object of the present invention to provide a washing machine motor enabling torque conversion by shifting a rotational speed of an inner shaft from among the inner shaft and an outer shaft so as to be appropriate for a large-capacity washing machine and a washing machine having the same.

It is yet another object of the present invention to provide a washing machine in which directions of rotation and rotational speeds of a pulsator and a washing tub are independently controlled, respectively, to thus form a variety of water flow patterns, improve a cleaning capability, improve fabric loose performance, prevent fabric tangling, enable rhythm washability, and control the water flow intensity.

The objects of the present invention are not limited to the above-described objects, and other objects and advantages of the present invention can be appreciated by the following description and will be understood more clearly by embodiments of the present invention.

Technical Solution

To accomplish the above and other objects of the present invention, according to an aspect of the present invention, there is provided a washing machine motor comprising: an inner rotor connected with an outer shaft; an outer rotor connected with an inner shaft; and a stator disposed with an air gap between the inner rotor and the outer rotor and for driving the inner rotor and the outer rotor independently, wherein the outer shaft is rotated at the same speed as that of the inner rotor, and the rotational speed of the inner shaft is decelerated compared to that of the outer rotor so as to increase a torque.

Preferably but not necessarily, the outer shaft comprises: a first outer shaft connected to the inner rotor; and a second outer shaft connected to a washing tub, and the inner shaft comprises: a first inner shaft connected to the outer rotor, and a second inner shaft connected to a pulsator.

Preferably but not necessarily, a planetary gear set is provided between the first inner shaft and the second inner shaft in order to decelerate the rotational speed.

Preferably but not necessarily, the planetary gear set comprises: a ring gear coupling the first outer shaft and the second outer shaft; a sun gear coupled to the first inner shaft;

a planetary gear engaged with an outer surface of the sun gear and an inner surface of the ring gear; and a carrier to which the planetary gear is rotatably supported and that is connected to the second inner shaft.

Preferably but not necessarily, a first bearing is provided between the first inner shaft and the first outer shaft to thus support the first outer shaft and the first inner shaft, and a second bearing is supported on an outer surface of the second outer shaft, and the second bearing is fixed to a bearing housing.

Preferably but not necessarily, the bearing housing comprises: a bearing mounting portion on which the second bearing is mounted; a seal fixing portion that is extended outwardly from the bearing mounting portion and to which a second seal is fixed; a link that is bent downwardly from the seal fixing portion to thus form a cylindrical shape; and a flat plate that is horizontally extended outwardly from the bottom of the link, and on which a plurality of first coupling holes with which the stator is coupled and a plurality of second coupling holes that are coupled on a lower surface of an outer tub are formed.

Preferably but not necessarily, a first link to which an inner rotor support of the inner rotor is connected is formed on an outer surface of the first outer shaft and a second link to which an outer rotor support of the outer rotor is connected is formed on an outer surface of the first inner shaft.

Preferably but not necessarily, a first locking nut to prevent the release of the inner rotor support is fastened with the first outer rotor, and a second locking nut to prevent the release of the outer rotor support is fastened with the first inner rotor.

Preferably but not necessarily, the stator comprises: a plurality of stator cores that are made of a split type and assembled and arranged in an annular form; bobbins that are wrapped on respective outer circumferential surfaces of the plurality of stator cores; a first coil wound on one side of each of the stator cores; a second coil wound on the other side of each of the stator cores; and a stator support in which the plurality of stator cores are arranged and integrated in an annular shape and that is fixed to the bearing housing.

Preferably but not necessarily, each stator core comprises: a first tooth portion around which the first coil is wound; a second tooth portion that is formed on the other side of the first tooth portion and around which the second coil is wound; a partition for partitioning between the first tooth portion and the second tooth portion; and couplers that are respectively formed on both ends of the partition and that mutually couple the plurality of the stator cores.

Preferably but not necessarily, the stator support is integrally formed with the plurality of stator cores by insert molding.

Preferably but not necessarily, a first connector and a second connector that respectively apply an output of an inverter to the first coil and the second coil are independently mounted on an outer side of the stator support.

According to another aspect of the present invention, there is provided a washing machine motor comprising: an inner rotor connected with an outer shaft; an outer rotor connected with an inner shaft; a stator disposed with an air gap between the inner rotor and the outer rotor and for driving the inner rotor and the outer rotor independently; and a planetary gear set that is provided in the inner shaft to thus decelerate the speed, wherein the outer shaft comprises: a first outer shaft connected to the inner rotor; and a second outer shaft connected to a washing tub, and the inner shaft comprises: a first inner shaft connected to the outer rotor, and a second inner shaft connected to a pulsator, and wherein the planetary gear set is provided between the first inner shaft and the second inner shaft.

According to another aspect of the present invention, there is provided a washing machine comprising: an outer tub that accommodates wash water; a washing tub rotatably disposed inside the outer tub to thus perform washing and dewatering; a pulsator rotatably disposed inside the washing tub to thus form wash water flows; and a washing machine motor that independently rotatably drives the washing tub and the pulsator, wherein the washing machine motor comprises: an inner rotor connected with an outer shaft; an outer rotor connected with an inner shaft; a stator disposed with an air gap between the inner rotor and the outer rotor and for driving the inner rotor and the outer rotor independently; and a planetary gear set that is provided in the inner shaft to thus decelerate the speed, and wherein the outer shaft is rotatably supported in two-way directions.

Preferably but not necessarily, the pulsator and the washing tub of the washing machine are driven in different directions and at different speeds from each other, so as to form strong water flows in a pattern form.

Preferably but not necessarily, the pulsator and the washing tub of the washing machine are driven in different directions from each other and at an identical speed to each other, so as to form strong water flows to heighten a cleaning capability.

Preferably but not necessarily, the pulsator and the washing tub of the washing machine are driven at a variable speed so as to form rhythmic water flows.

Preferably but not necessarily, the pulsator and the washing tub of the washing machine are driven in an identical direction to each other and at different speeds from each other, so as to form a vortex to prevent damage to the laundry.

Preferably but not necessarily, the washing machine further comprises first and second bearings that are both provided in the outer shaft and that respectively rotatably support the outer shaft and the planetary gear in two-way directions.

Advantageous Effects

As described above, the present invention provides a washing machine motor having a double rotor-double stator structure and providing a dual-power, to thereby independently drive a pulsator and a washing tub, respectively, and to thus remove an existing clutch mechanism to thereby simplify a structure, and to thus enable the pulsator and the washing tub to be reversely driven to thereby form a variety of wash water flows.

In addition, the present invention is configured to independently drive a pulsator and a washing tub, respectively, and to set a planetary gear set to be in a rotatable state in two-way directions, to thereby enable dual-power and mono-power implementations and form a variety of water flow patterns, to thereby improve performance of a washing machine.

Further, the present invention is configured to employ a planetary gear set in an inner shaft from among the inner shaft and an outer shaft that are respectively connected to a washing tub and a pulsator, to thus decelerate a speed to increase a torque to thereby implement a large-capacity washing machine.

The present invention is configured to independently control directions of rotation and rotational speeds of a pulsator and a washing tub, respectively, to thus form a variety of water flow patterns, improve a cleaning capability, improve fabric loose performance, prevent fabric tangling, enable rhythm washability, and control the water flow intensity.

BEST MODE

Hereinafter, embodiments of the present invention will be described in detail with reference to the accompanying drawings. In the process, the size and shape of the components illustrated in the drawings may be shown exaggerated for convenience and clarity of explanation. Further, by considering the configuration and operation of the present invention the specifically defined terms can be changed according to user's or operator's intention, or the custom. Definitions of these terms herein need to be made based on the contents across the whole application.

Figure 1:
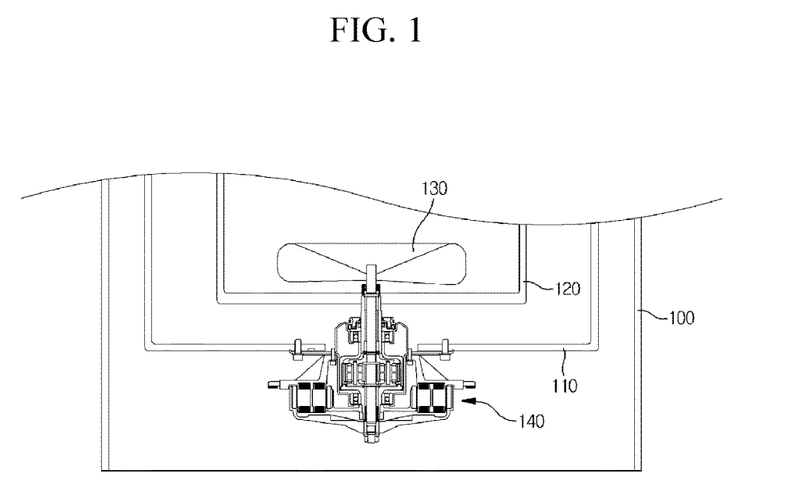
FIG. 1 is a cross-sectional view of a washing machine according to an embodiment of the present invention.
Figure 2:
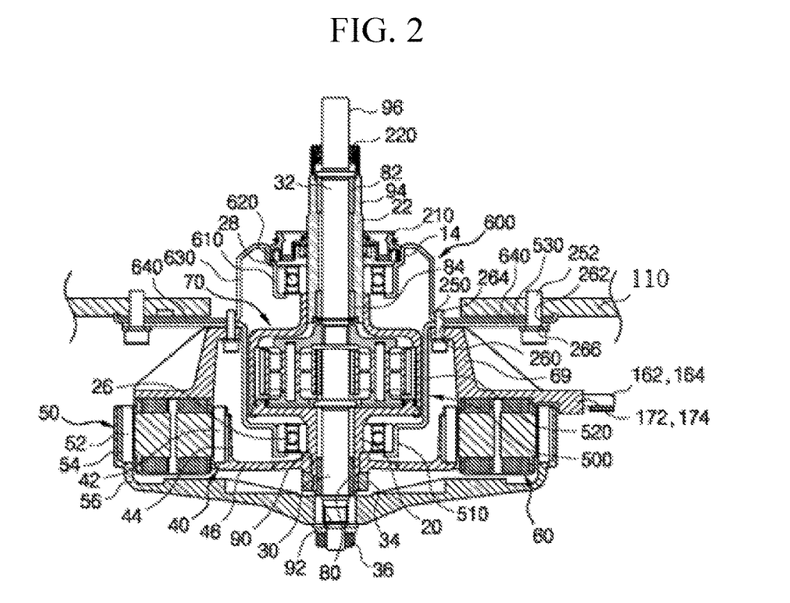
FIG. 2 is a cross-sectional view of a washing machine motor according to an embodiment of the present invention.

FIG. 1 is a cross-sectional view of a washing machine according to an embodiment of the present invention, and FIG. 2 is a cross-sectional view of a washing machine motor according to an embodiment of the present invention.

Referring to FIGS. 1 and 2, a washing machine according to an embodiment of the present invention includes: a case 100 forming an outer appearance; an outer tub 110 which is disposed in an inside of the case 100 and accommodating washing water; a washing tub 120 which is rotatably disposed inside the outer tub 110 to perform washing and dehydrating; a pulsator 130 which is rotatably disposed inside the washing tub 120 to form washing water flows; and a washing machine motor 140 which is mounted on a lower portion of the washing tub 120, to drive the washing tub 120 and the pulsator 130 simultaneously or selectively.

As shown in FIG. 2, the washing machine motor 140 includes: outer shafts 20 and 22 connected to the washing tub 120; inner shafts 30 and 32 rotatably disposed inside the outer shafts 20 and 22 and connected to the pulsator 130; an inner rotor 40 connected to the outer shafts 20 and 22; an outer rotor 50 connected to the inner shafts 30 and 32; a stator 60 disposed between the inner rotor 40 and the outer rotor 50 with an air gap; and a planetary gear set 70 mounted on the inner shafts 30 and 32 so as to reduce the rotational speeds of the inner shafts 30 and 32 and increase the torque thereof.

Here, when the pulsator 130 is connected to the outer shafts 20 and 22, the planetary gear set 70 is provided in the outer shafts 20 and 22 to thereby decelerate the rotational speed of the outer shafts 20 and 22.

The outer shafts 20 and 22 are formed in a cylindrical shape so that the inner shafts 30 and 32 pass through the outer shafts 20 and 22, respectively, and include a first outer shaft 20 coupled to the inner rotor 40, and a second outer shaft 22 coupled to the washing tub 120.

Then, the inner shafts 30 and 32 include a first inner shaft 30 coupled to the outer rotor 50 and a second inner shaft 32 coupled to the pulsator 130.

Figure 3:
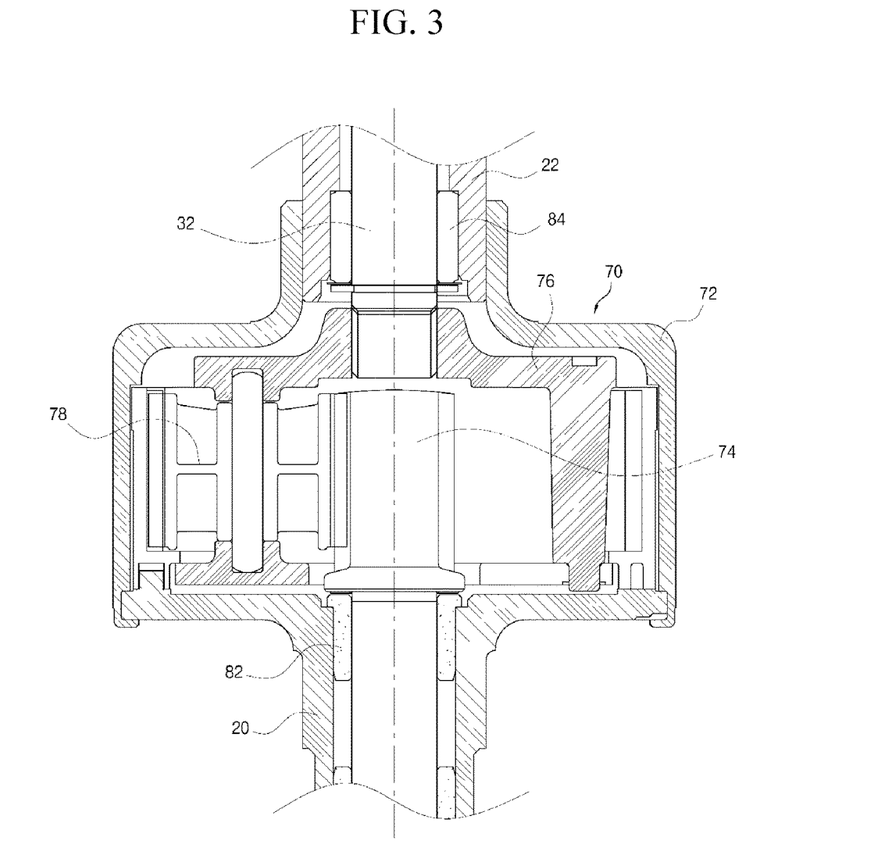
FIG. 3 is a cross-sectional view of a planetary gear set according to an embodiment of the present invention.

As shown in FIG. 3, the planetary gear set 70 includes: a ring gear 72 connecting between the first outer shaft 20 and the second outer shaft 22; a sun gear 74 integrally coupled to the first inner shaft 30; a plurality of planetary gears 78 engaged with an outer surface of the sun gear 74 and an inner surface of the ring gear 72; and a carrier 76 to which the plurality of planetary gears 78 are rotatably supported and that is connected to the second inner shaft 32.

The planetary gear set 70 is configured so that the first outer shaft 20 and the second outer shaft 22 are connected by the ring gear 72 and thus the rotational speed of the first outer shaft 20 is transferred to the second outer shaft 22. Therefore, the rotating speed of the first outer shaft 20 is the same as that of the second outer shaft 22.

In addition, the first inner shaft 30 is formed integrally with the sun gear 74, and the second inner shaft 32 is spline-coupled with the carrier 76. The carrier 76 is rotatably supported in the center of the planetary gears 78. As a result, the rotational speed of the first inner shaft 30 is decelerated to then be transmitted to the second inner shaft 32.

In this way, the inner shafts 30 and 32 are interconnected via the planetary gear set 70 to thus decelerate the rotational speed of the outer rotor 50 to then be transmitted to the pulsator 130, to thereby increase the torque of the pulsator 130 and accordingly be applicable to a large-capacity washing machine.

A first link 90 to which an inner rotor support 46 of the inner rotor 40 is connected is formed on an outer surface of the first outer shaft 20 and a second link 92 to which an outer rotor support 56 of the outer rotor 50 is connected is formed on a lower end of the first inner shaft 30.

A third link 94 is formed on the upper outer surface of the second outer shaft 22 in which the washing tub 120 is connected to the third link 94, and a fourth link 96 is formed on the upper outer surface of the second inner shaft 32 in which the pulsator 130 is connected to the fourth link 96.

The first link 90, the second link 92, the third link 94 and the fourth link 96 may be serration-coupled or spline-coupled through protrusions formed on the outer surfaces of the first outer shaft 20, the second outer shaft 22, the first inner shaft 30, and the second inner shaft 32, or mutually key-coupled through key grooves formed on the outer surfaces of the first outer shaft 20, the second outer shaft 22, the first inner shaft 30, and the second inner shaft 32.

Here, a first locking nut 34 is screwed and coupled at the lower end of the first outer shaft 20, in which the first locking nut 34 prevents the departure of the inner rotor support 46 of the inner rotor 40 from the first outer shaft 20, and a second locking nut 36 is screwed and coupled at the lower end of the first inner shaft 30, in which the second locking nut 36 prevents the departure of the outer rotor support 56 of the outer rotor 50 from the first inner shaft 30.

A first sleeve bearing 80 and a second sleeve bearing 82 are provided on upper and lower inner surfaces of the first outer shaft 20, respectively, to thus rotatably support the first inner shaft 30, and a third sleeve bearing 84 and a fourth sleeve bearing 86 are provided on upper and lower inner surfaces of the second outer shaft 22, respectively, to thus rotatably support the second inner shaft 32.

A first seal 220 is mounted between the second outer shaft 22 and the second inner shaft 32 to prevent the washing water from leaking, and a second seal 210 is mounted between the second outer shaft 22 and a second bearing housing 600 to prevent the washing water from leaking.

A first bearing 26 is disposed on the outer surface of the first outer shaft 20, to thus rotatably support the first outer shaft 20 and a second bearing 28 is disposed on the outer surface of the second outer shaft 22, to thus rotatably support the second outer shaft 22.

The first bearing 26 is provided in a first bearing housing 500 and the second bearing 28 is provided in the second bearing housing 600. The first and second bearings 26 and 28 are formed in a structure enabling a two-way rotation, and support the first and second outer shafts 20 and 22 so as to be rotatable in two-way directions, to thereby enable the planetary gear set 70 to be rotatable in two-way directions.

The first bearing housing 500 is formed of a metallic material, and includes: a first bearing mount portion 510 in which the first bearing 26 is mounted; a cover portion 520 that is extended outwardly from the first bearing mount portion 510 to thus form a cylindrical shape, and that is disposed with a predetermined gap to wrap around the outer surface of the planetary gear set 70 to protect the planetary gear set 70; a stator 60 that is extended outwardly from the top of the cover portion 520 to thus form a circular plate; and a flat plate portion 530 to which the outer tub 110 is fixed.

A plurality of first coupling holes 260 are formed on the inside of the flat plate portion 530, in which the stator 60 is coupled with the flat plate portion 530 with bolts 250 through the plurality of first coupling holes 260 in the circumferential direction of the flat plate portion 530, and a plurality of second coupling holes 266 are formed on the outside of the flat plate portion 530, in which the outer tub 120 is coupled with the flat plate portion 530 with bolts 252 through the plurality of second coupling holes 266 in the circumferential direction of the flat plate portion 530.

The second bearing housing 600 is formed of a metallic material, and includes: a second bearing mount portion 610 in which the second bearing 28 is mounted; a second seal fastener 620 that is extended outwardly from the second bearing mount portion 610 to thus fasten the second seal 210; a link 630 that is bent downwardly from the second seal fastener 620 to thus form a cylindrical shape; and a flat plate portion 640 that is extended outwardly from a lower end of the link 630 to thus be fixed to the outer tub 110.

A plurality of third coupling holes 264 are formed on the inside of the flat plate portion 640, in which the plurality of third coupling holes 264 are communicated from the plurality of first coupling holes 260 and fitted with the bolts 250, and a plurality of fourth coupling holes 262 are formed on the outside of the flat plate portion 640, in which the plurality of fourth coupling holes 262 are communicated from the plurality of second coupling holes 266 and fitted with the bolts 252.

Here, the flat plate portion 530 of the first bearing housing 500 and the flat plate portion 640 of the second bearing housing 600 are overlapped with each other, and thus a coupling strength between the stator 60 and the outer tub 110 can be enhanced.

The inner rotor 40 includes: a plurality of first magnets 42 that are disposed on the inner surface of the stator 60 with a certain gap; a first back yoke 44 disposed on the rear surfaces of the plurality of first magnets 42; and an inner rotor support 46 that is integrally formed with the first magnets 42 and the first back yoke 44 by an insert molding method.

Here, the inner rotor support 46 is integrally formed with the plurality of first magnets 42 and the first back yoke 44 by molding a thermosetting resin, for example, a BMC (Bulk Molding Compound) molding material such as polyester. Thus, the inner rotor 40 may have waterproof performance, and shorten the manufacturing process.

The inner rotor support 46 is configured to surround the outer surfaces of the first magnets 42 and the first back yoke 44, and to be bent perpendicularly from the first magnets 42 and the first back yoke 44 to then be extended inwards, in which the inner rotor support 46 is formed in a cup shape with one side thereof opened. The inner surface of the inner rotor support 46 is connected to the first link 90 of the first outer shaft 20 and is rotated with the first outer shaft 20, and the first magnets 42 and the first back yoke 44 are integrally formed on the outer surface of the inner rotor support 46.

Then, the outer rotor 50 includes: a plurality of second magnets 52 that are disposed on the outer surface of the stator 60 with a certain gap; a second back yoke 54 disposed on the rear surface of the plurality of the second magnets 52; and an outer rotor support 56 that is integrally formed with the second magnets 52 and the second back yoke 54 by an insert molding method.

Here, the outer rotor support 56 is integrally formed with the plurality of second magnets 52 and the second back yoke 54 by molding a thermosetting resin, for example, a BMC (Bulk Molding Compound) molding material such as polyester. Thus, the outer rotor 50 may have waterproof performance, and shorten the manufacturing process.

The outer rotor support 56 is configured to surround the outer surfaces of the second magnets 52 and the second back yoke 54, and to be bent perpendicularly from the second magnets 52 and the second back yoke 54 to then be extended inwards, in which the outer rotor support 56 is formed in a cup shape with one side thereof opened. The inner surface of the outer rotor support 56 is connected to the second link 92 of the first inner shaft 30 and is rotated with the first inner shaft 30, and the second magnets 52 and the second back yoke 54 are integrally formed on the outer surface of the outer rotor support 56.

Figure 4:
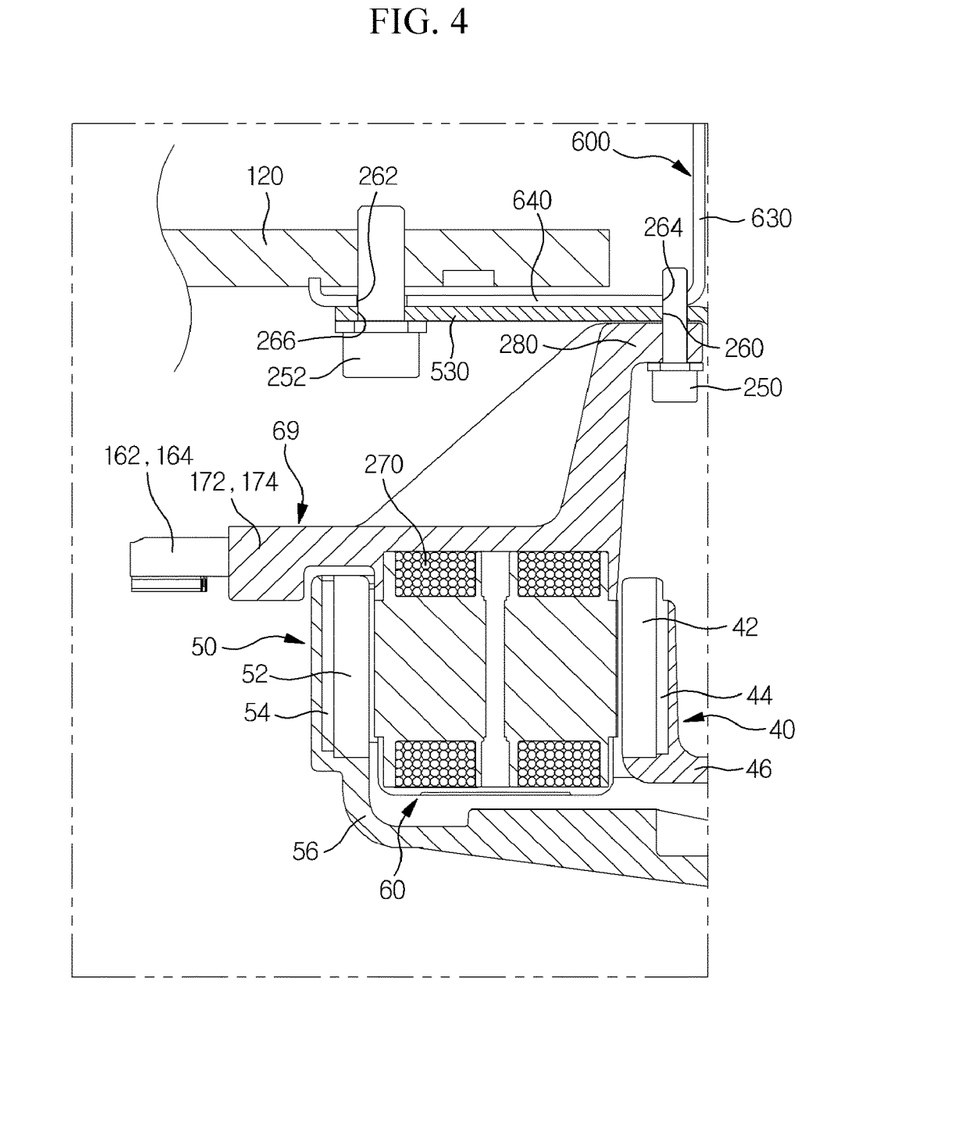
FIG. 4 is a cross-sectional view of a stator according to an embodiment of the present invention.
Figure 5:
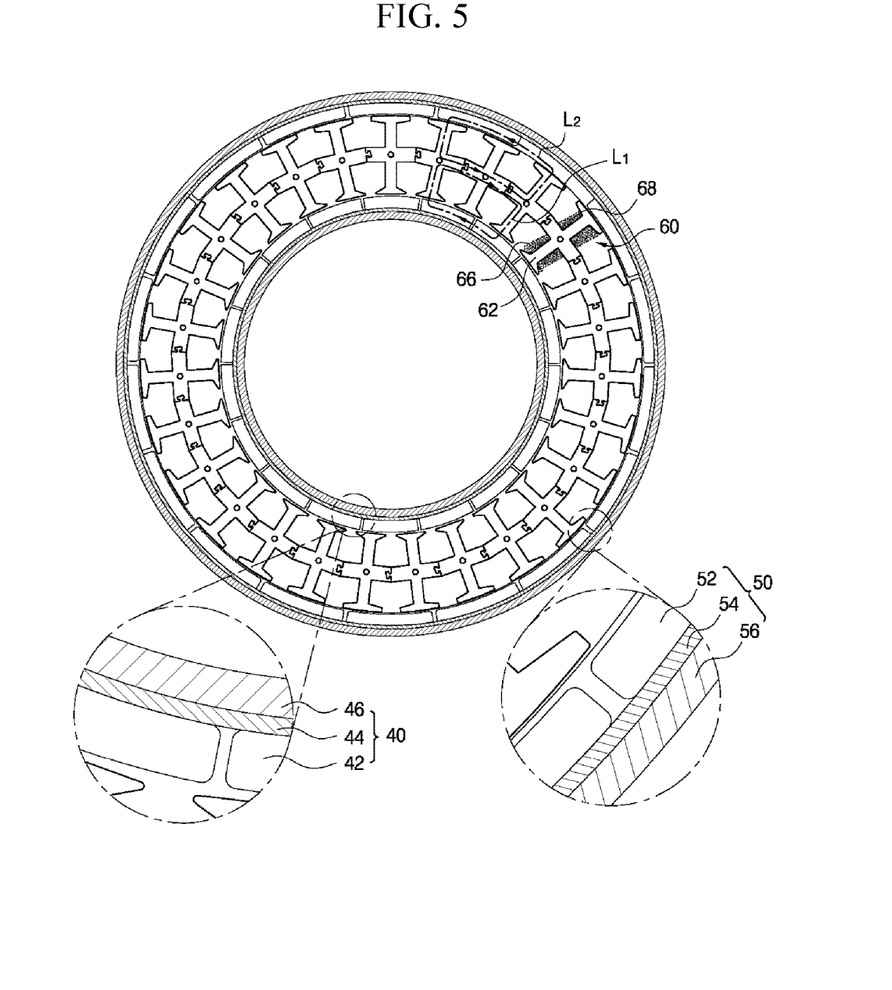
FIG. 5 is a horizontal cross-sectional view of a washing machine motor according to an embodiment of the present invention.
Figure 6:
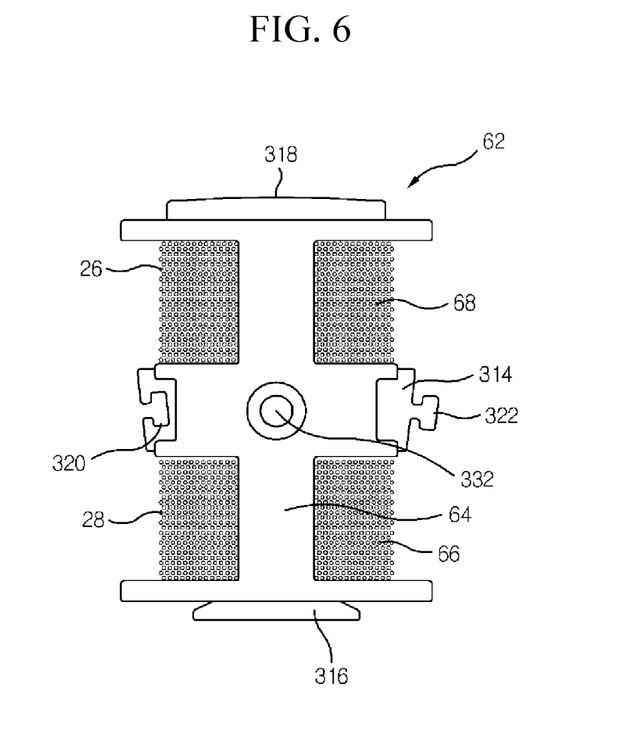
FIG. 6 is a cross-sectional view of a stator according to an embodiment of the present invention.
Figure 7:
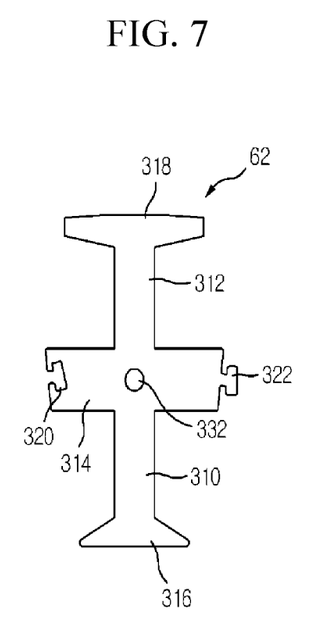
FIG. 7 is a cross-sectional view of a stator core according to an embodiment of the present invention.

FIG. 4 is a cross-sectional view of a stator according to an embodiment of the present invention, FIG. 5 is a horizontal cross-sectional view of a washing machine motor according to an embodiment of the present invention, FIG. 6 is a cross-sectional view of a stator according to an embodiment of the present invention, and FIG. 7 is a cross-sectional view of a stator core according to an embodiment of the present invention.

The stator 60 includes: a plurality of stator cores 62 that are arranged in an annular shape; insulating bobbins 64 that are configured to wrap the outer circumferential surfaces of the plurality of stator cores 62, respectively; a first coil 66 that is wound on a first tooth portion 310 of each of the stator cores 62; a second coil 68 that is wound on a second tooth portion 312 of each of the stator cores 62; and a stator support 69 in which the plurality of stator cores 62 are arranged in an annular shape and that is fixed to the second bearing housing 600.

In the above embodiment, a plurality of stator cores 62 made of a split type are assembled in an annular form to thus form a stator core body, and are integrated by the stator support 69, but the stator core body may be formed of a one-piece.

Here, a first output of a first inverter 530 is applied to the first coil 66 and a second output of a second inverter 540 is applied to the second coil 68. Accordingly, the first output is applied to the first coil 66, only the inner rotor 40 is rotated, when the second output is applied to only the second coil 68, only the outer rotor 50 is rotated, and when the first output and the second output are applied to the first coil 66 and second coil 68, respectively, both the inner rotor 40 and outer rotor 50 are rotated.

The stator core 62 includes: a first tooth portion 310 around which the first coil 66 is wound; a second tooth portion 312 that is formed on the other side of the first teeth portion 310 and around which the second coil 68 is wound; a partition 314 for partitioning between the first tooth portion 312 and the second tooth portion 314; and couplers 320 and 322 formed on both lateral ends of the partition 314 and interconnecting between the adjoining stator cores 62.

A first flange 316 is formed at the end of the first tooth portion 310 so as to be disposed to face the first magnets 42 and a second flange 318 is formed at the end of the second tooth portion 312 so as to be disposed to face the second magnets 52.

The first flange 316 and the second flange 318 are formed to have inward and outward curved surfaces at predetermined curvatures, respectively, to correspond to the first magnet 42 of the inner rotor 40 and the second magnet 52 of the outer rotor 50. Thus, the roundness of the inner circumferential surface and the outer circumferential surface of the stator core 62 is increased and thus certain magnetic gaps can be maintained between the inner circumferential surface of the stator 60 and the first magnet 42 and between the outer circumferential surface of the stator 60 and the second magnet 52, respectively, although the inner circumferential surface and outer circumferential surface of the stator 60 are proximate to the first magnet 42 and the second magnet 52.

Figure 8:
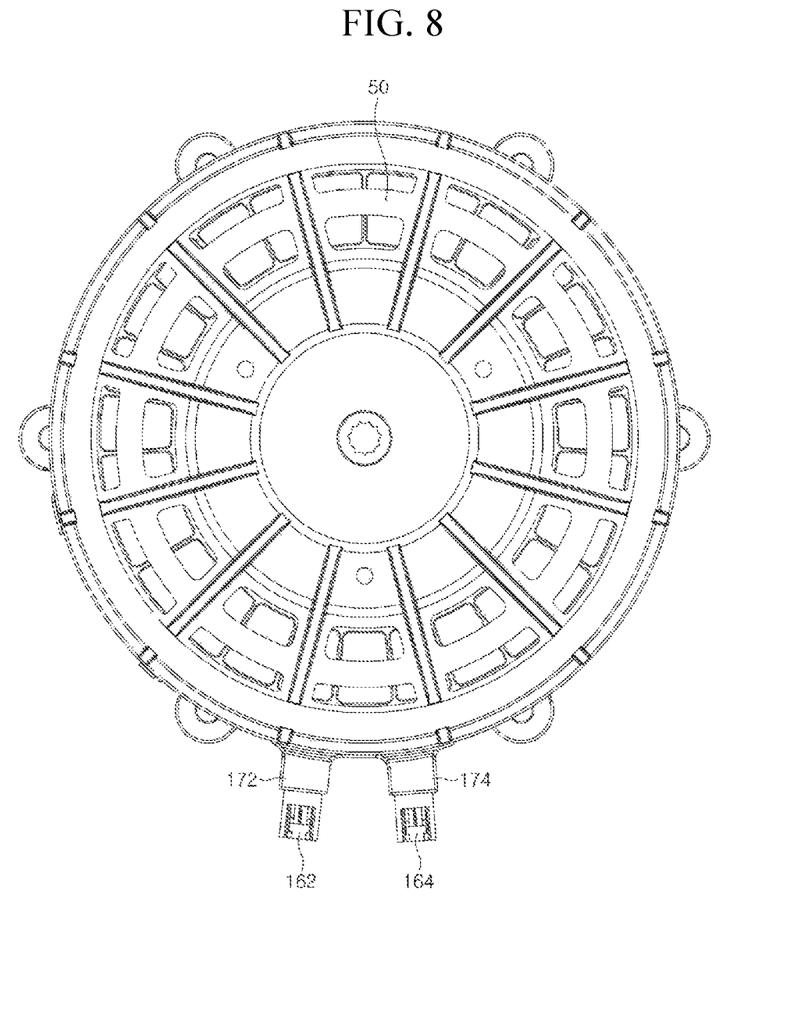
FIG. 8 is a cross-sectional view of a stator support according to an embodiment of the present invention.

The stator support 69 is integrally formed with the stator cores 62 by an insert molding method after arranging the plurality of split-type stator cores 62 in a temporarily assembled state in an annular form in the circumferential direction thereof in a mold.

In other words, the stator support 69 is molded by the insert molding method by molding a thermosetting resin, for example, a BMC (Bulk Molding Compound) molding material such as polyester. In this case, the plurality of temporarily assembled stator cores 62 are arranged in an annular form in a mold, and thus are integrally formed.

Other than the structure that the stator support 69 is integrally formed with the stator cores 62 by insert molding, the stator support 69 may be separately manufactured from the stator cores 62 and then coupled with the stator cores 62 by using bolts.

Connectors 162 and 164 are mounted on the outside of the stator support 69, in which the connectors 162 and 164 apply the outputs of the first and second inverters 530 and 540 to the first coil 66 and second coil 68, respectively. The connectors 162 and 164 include a first connector 162 to which the first output of the first inverter 530 applied to the first coil 66 is connected in order to rotate the washing tub 120, and a second connector 164 to which the second output of the second inverter 540 applied to the second coil 68 is connected in order to rotate the pulsator 130.

As shown in FIG. 8, a first connector fixing portion 172 to which the first connector 162 is fixed and a second connector fixing portion 174 to which the second connector 164 is fixed are formed on the outer surface of the stator support 69, respectively.

Here, the first connector fixing portion 172 and the second connector fixing portion 174 are integrally formed at the time of insert injection molding of the stator support 69. In other words, when the first connector 162 and the second connector 164 are placed in a mold and are subjected to insert molding, the first connector fixing portion 172 is wrapped on the outer surface of the first connector 162 and thus the first connector 162 is fixed, and the second connector fixing portion 174 is wrapped on the outer surface of the second connector 164 and thus the second connector 164 is fixed.

The plurality of stator cores 62 should have a structure of being directly connected to each other so as to form a magnetic circuit. Thus, the couplers 320 and 322 of one stator core 62 have a structure of being directly connected to the couplers 322 and 320 of another adjacent stator core 62 so that the stator cores 62 can be energized.

As an example, these couplers 320 and 322 are configured so that a coupling protrusion 322 is protrudingly formed at one side of the partition 314 and a coupling groove 320 with which the coupling protrusion 322 is fitted and coupled is formed at the other side of the partition 314. Thus, when the coupling protrusion 322 is fitted into and coupled with the coupling groove 320, the stator cores 62 are radially arranged, and have a directly cross-linked structure that the stator cores 62 are directly connected with each other.

In addition to the above structure, the couplers have a structure that pinholes are form at both end portions of the partition of each of the stator cores, and a pin member is fitted into and coupled with the pinholes of two stator cores at a state where the stator cores 62 contact each other, to thereby employ a structure of connecting between the stator cores. Alternatively, the couplers may employ a method of caulking the stator cores by using a caulking member in a state where the stator cores contact each other.

The washing machine driving apparatus including the washing machine motor 140 according to an embodiment of the present invention forms a first magnetic circuit L1 between the inner rotor 40 and one side of the stator 60 where the first coil 66 is wound, and forms a second magnetic circuit L2 between the outer rotor 50 and the other side of the stator 60 where the second coil 68 is wound, to thus form a pair of magnetic circuits each independent to each other. As a result, the inner rotor 40 and the outer rotor 50 can be respectively driven separately.

More specifically, the first magnetic circuit L1 includes the first magnet 42 of the N-pole, the first tooth portion 310 on which the first coil 66 is wound, an inner part of the partition 314, the adjacent first tooth portion 310, the first magnet 42 of the S-pole adjacent to the first magnet 42 of the N-pole, and the first back yoke 44.

In addition, the second magnetic circuit L2 includes the second magnet 52 of the N-pole, the second teeth portion 312 facing the second magnet 52 of the N-pole and on which the second coil 68 is wound, an outer part of the partition 314, the adjacent second teeth portion 312, the second magnet 52 of the S-pole, and the second back yoke 54.

In the above-described first embodiment, the output of the inner rotor 40 of the washing machine motor 140 is transmitted to the inner shafts 30 and 32, and the output of the outer rotor 50 thereof is transmitted to the outer shafts 20 and 22.

The function of the washing machine motor according to an embodiment of the present invention will now be described.

Figure 9:
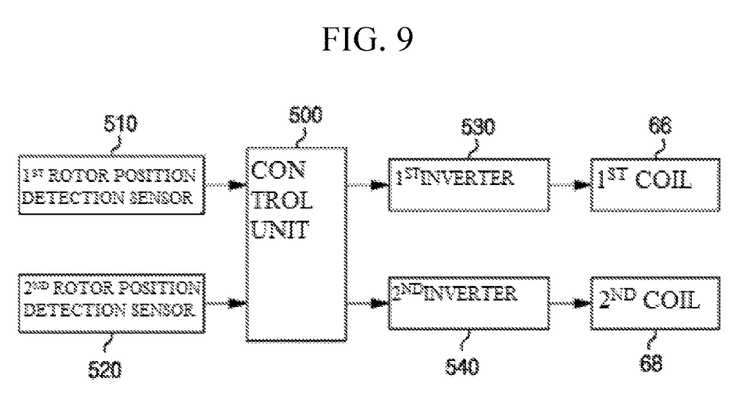
FIG. 9 is a block diagram of a washing machine control apparatus according to an embodiment of the present invention.

Referring to FIG. 9, a washing machine control apparatus according to an embodiment of the present invention includes: a first inverter 530 for generating a first drive signal applied to the first coil 66; a second inverter 540 for generating a second drive signal applied to the second coil 68, and a control unit 500 for controlling the first inverter 530, the second inverter 540 and the entire washing machine.

The control unit 500 is configured to play a role of a system control unit that serves to control the first and second inverters 530 and 540, and simultaneously the entire washing machine as described above, or is configured to function as a driver dedicated control unit that receives a washing control signal that is determined according to a washing course set by a user from a system control unit of a main body of a washing machine and then applies individual control signals to the first and second inverters 530 and 540 based on the washing control signal. The control unit 500 may be implemented by using a signal processor such as a microcomputer or a microprocessor.

According to an embodiment of the present invention, the washing machine motor 140 has a double rotor-double stator dual-power structure, for example, the motor control thereof is performed by a U, V, W three-phase drive method. Therefore, the first and second coils 66 and 68 of the stator 60 are formed to include U, V, and W 3-phase coils, respectively. The first coil 66 wound on the first tooth portion 310 forms the inner stator, and the second coil 68 wound on the second tooth portion 312 forms the outer stator.

As a result, the inner rotor 40 that is rotated by the inner stator forms the inner motor, and the outer rotor 50 that is rotated by the outer stator forms the outer motor. The motor structures of the inner motor and the outer motor are designed so as to be controlled in a BLDC method, respectively, and the first and second inverters 530 and 540 perform a drive control, for example, a six-step drive control method.

The first and second inverters 530 and 540 can be made of three pairs of switching transistors connected in a totem pole structure, respectively. The three-phase outputs from the respective inverters are applied to the U, V, W 3-phase coils of the first and second coils 66 and 68, respectively.

The control unit 500 that controls the first and second inverters 530 and 540 detects the rotational positions of the inner rotor 40 and the outer rotor 50 from first and second rotor position detection sensors 510 and 520, respectively, for example, Hall sensors and applies control signals of a PWM mode to the first and second inverters 530 and 540. In this case, the first and second inverters 530 and 540 apply the U, V, W 3-phase outputs to the U, V, W 3-phase coils of the first and second coils 66 and 68, respectively, to thereby rotatably drive the inner rotor 40 and the outer rotor 50.

Accordingly, the control unit 500 according to an embodiment of the present invention controls the first and second inverters 530 and 540 to thereby optionally and independently apply the outputs of the first and second inverters 530 and 540 to the first and second coils 66 and 68, respectively. Accordingly, the inner rotor 40 and the outer rotor 50 can be selectively and independently rotatably driven.

In addition, the planetary gear set 70 is configured so that the ring gear 72 is connected between the first and second outer shafts 20 and 22, and the first and second outer shafts 20 and 22 are rotatably supported in two-way directions by the first and second bearings 26 and 28 that are rotatable in two-way directions. Therefore, the planetary gear set 70 is also rotatably supported in two-way directions.

Thus, a washing machine according to an embodiment of the present invention employs the washing machine motor 140 having a double rotor-double stator structure, and adopts first and second inverters 530 and 540 to apply the U, V, W 3-phase outputs to the U, V, W 3-phase coils of the first and second coils 66 and 68 to rotatably drive the inner rotor 40 and the outer rotor 50. As a result, the rotational forces of the outer rotor 50 and the inner rotor 40 are applied to the pulsator 130 and the washing tub 120, through the inner shafts 30 and 32, the outer shafts 20 and 22, and the planetary gear set 70, to independently drive the pulsator 130 and the washing tub 120. In addition, the planetary gear set 70 is supported by the first and second bearings 26 and 28, both of which enable two-way rotation, to thereby control the rotational direction and the rotational speed of the pulsator 130 and the washing tub 120, to thus form a variety of water flows.

Controlling the washing machine using the above-described washing machine motor 140 will be described as follows.

First, when only the pulsator 130 is driven during a washing stroke, and the second output is applied to the second coil 68 from the second inverter 540, the outer rotor 50 is rotated and the first inner shaft 30 connected to the outer rotor 50 is rotated. Then, the rotational speed is decelerated by the planetary gear set 70 coupled to the first inner shaft 30 to then be transmitted to the second inner shaft 32, and the pulsator 130 connected to the second inner shaft 32 is rotated.

In this way, the rotational speed directed to the pulsator 130 is reduced by the planetary gear set 70 and the torque thereof is increased. Thus, the washing machine motor according to the embodiment of the present invention can be applied to a large-capacity washing machine.

Further, when both the pulsator 130 and the washing tub 120 are simultaneously rotated in an identical direction, during a dehydration stroke and a rinsing stroke, the first and second outputs are applied to the first coil 66 and the second coil 68 from the first and second inverters 530 and 540. Then, the inner rotor 40 is rotated by the magnetic circuit L1, and thus the outer shaft 20 associated with the inner rotor 40 is rotated, to thereby rotate the washing tub 120. Then, the outer rotor 50 is rotated by the magnetic circuit by L2, and thus the inner shaft 30 connected to the outer rotor 50 is rotated to thereby rotate the pulsator 130. In this case, it is preferable to control the rotational speed of the washing tub 120 to be the same as that of the pulsator 130.

In addition, when the pulsator 130 and the washing tub 120 are reversely rotated to each other for the washing stroke, rinsing stroke, and a fabric detangle stroke for removing laundry tangle such as laundry jam, the inverter outputs are applied to the first coil 66 and the second coil 68 simultaneously or with a time delay, and the first inverter output applied to the first coil 66 and the second inverter output applied to the second coil 68 are each controlled independently, to thereby rotate the pulsator 130 and the washing tub 120 in opposite directions to each other while rotating the inner rotor 40 and the outer rotor 50 in opposite directions to each other.

Further, a variety of wash water flows can be formed by rotating the pulsator 130 and the washing tub 120 in an identical direction at an identical speed, or in an identical direction at respectively different speed, during a washing stroke and a rinsing stroke.

As described above, when driving the pulsator 130 and the washing tub 120 in different directions and at an identical speed, according to the embodiment of the present invention, it is possible to form strong washing water flows, and when driving the pulsator 130 and the washing tub 120 in different directions and at different speeds, it is possible to form various patterns of strong washing water flows.

In particular, when the pulsator 130 and the washing tub 120 are driven in different directions and at different speeds, strong vertical rising/falling water flows by the pulsator and a vortex by the washing tub washing are created, to thereby improve a cleaning capability and improve rinsing performance.

In some embodiments, the rotation speeds of the pulsator 130 and the washing tub 120 may vary to thereby form rhythm water flows, and to resultantly realize the rhythmic washing. That is, when the rotation speeds of the pulsator 130 and the washing tub 120 are controlled to be rapidly variable, strong water flows and rhythmic water flows can be formed to thereby prevent damage to the laundry.

In addition, the pulsator 130 and the washing tub 120 can be rotated with a time difference to form a variety of wash water flows, and thus a wide range of washing water flows can be formed.

As described above, the present invention has been described with respect to particularly preferred embodiments. However, the present invention is not limited to the above embodiments, and it is possible for one of ordinary skill in the art to make various modifications and variations, without departing off the spirit of the present invention. Thus, the protective scope of the present invention is not defined within the detailed description thereof but is defined by the claims to be described later and the technical spirit of the present invention.

INDUSTRIAL APPLICABILITY

The present invention can be applied to a washing machine motor and a washing machine using the same, particularly to a full-automatic washing machine, in which a washing tub and a pulsator are separately driven to thereby form a variety of washing water flows.

The invention claimed is:

1. A washing machine motor comprising:
an inner rotor;
an outer rotor;
a double stator disposed with an air gap between the inner rotor and the outer rotor, and independently and selectively controlling the inner rotor and the outer and driving the inner rotor and the outer rotor selectively and independently from each other;
a first cylindrical outer shaft connected to the inner rotor;
a second cylindrical outer shaft connected to a washing tub;
a first inner shaft rotatably disposed inside the first cylindrical shaft and connected to the outer rotor;
a second inner shaft rotatably disposed inside the second cylindrical shaft and connected to a pulsator inside the washing tub;
a planetary gear set comprising: a ring gear fixedly coupled to the first cylindrical outer shaft and the second cylindrical outer shaft; a sun gear fixedly coupled to the first inner shaft; a plurality of planetary gears rotatably engaged with an outer surface of the sun gear and an inner surface of the ring gear; and a carrier coupled to the second inner shaft and rotatably supporting the planetary gears, wherein the planetary gear set is configured in such a way that, when a rotational force from the outer rotor is applied to the sun gear through the first inner shaft, a rotational speed of the outer rotor is decelerated through the planetary gears and is transmitted to the pulsator through the carrier and the second inner shaft; and, when a rotational force from the inner rotor is applied to the ring gear through the first cylindrical outer shaft, a rotational speed of the inner rotor is not decelerated and is transmitted to the washing tub through the ring gear and the second cylindrical outer shaft;
a first bearing mounted on an outer surface of the first cylindrical outer shaft and a second bearing mounted on an outer surface of the second cylindrical outer shaft in such a way that the planetary gear set is able to rotate in both directions; and
a control unit configured to control the double stator in such a manner that, when under a washing mode, the outer rotor and the inner rotor are driven in opposite directions to each other simultaneously or with a time delay to thereby generate a vortex water flow due to water flows by the pulsator and the washing tub rotating in opposite directions, and when under a dewatering mode, the outer rotor and the inner rotor are driven simultaneously in a same direction.

2. The washing machine motor of claim 1, wherein a first link to which an inner rotor support of the inner rotor is connected is formed on an outer surface of the first outer shaft and a second link to which an outer rotor support of the outer rotor is connected is formed on an outer surface of the first inner shaft.

3. The washing machine motor of claim 2, wherein a first locking nut to prevent release of the inner rotor support is fastened with the first cylindrical outer shaft, and a second locking nut to prevent release of the outer rotor support is fastened with the first inner shaft.

4. The washing machine motor of claim 1, wherein the first bearing is fixed to a first bearing housing and the second bearing is fixed to a second bearing housing.

5. The washing machine motor of claim 4, wherein the first bearing housing comprises:
a first bearing mounting portion on which the first bearing is mounted;
a cover portion that is extended outwardly from the first bearing mounting portion to thus form a cylindrical shape and that is disposed at a predetermined gap with an outer surface of the planetary gear set to protect the planetary gear set; and
a first flat plate that is extended outwardly from top of the cover portion to thus form a circular plate shape and to which the double stator and an outer tub are fixed.

6. The washing machine motor of claim 4, wherein the second bearing housing comprises:
a second bearing mounting portion on which the second bearing is mounted;
a second seal fixing portion that is extended outwardly from the second bearing mounting portion and to which a second seal is fixed;
a link that is bent downwardly from the second seal fixing portion to thus form a cylindrical shape;
a second flat plate that is extended outwardly from bottom of the link.

7. The washing machine motor of claim 1, wherein the double stator comprises:
a plurality of stator cores that are made of a split type and assembled and arranged in an annular form;
bobbins that are wrapped on respective outer circumferential surfaces of the plurality of stator cores;
a first coil wound on one side of each of the stator cores;
a second coil wound on the other side of each of the stator cores; and a stator support in which the plurality of stator cores are arranged and integrated in an annular shape.

8. The washing machine motor of claim 7, wherein each stator core comprises:
a first tooth portion around which the first coil is wound;
a second tooth portion that is formed on an opposite side of the first tooth portion and around which the second coil is wound;
a partition for partitioning between the first tooth portion and the second tooth portion; and
couplers that are respectively formed on both ends of the partition and that mutually couple the plurality of the stator cores.

9. The washing machine motor of claim 7, wherein the stator support is integrally formed with the plurality of stator cores by insert molding.

10. The washing machine motor of claim 7, wherein a first connector and a second connector that respectively apply an output of an inverter to the first coil and the second coil are independently mounted on an outer side of the stator support.

11. A washing machine comprising:
a washing machine motor according to claim 1, and
an outer tub that accommodates wash water;
wherein the washing tub rotatably disposed inside the outer tub to thus perform the washing mode and the dewatering mode; and
the pulsator rotatably disposed inside the washing tub to thus form wash water flows.

12. The washing machine of claim 11, wherein the pulsator and the washing tub are driven in different directions and at different speeds from each other.

13. The washing machine of claim 11, wherein the pulsator and the washing tub are driven in different directions from each other and at an identical speed to each other.

14. The washing machine of claim 11, wherein the pulsator and the washing tub are driven in an identical direction to each other and at different speeds from each other.

15. The washing machine motor of claim 1, wherein the double stator comprises:
a plurality of split type stator cores arranged in an annular form;
a first coil wound on one side of each of the split type stator cores; and
a second coil wound on the other side of each of the split type stator cores,
wherein the control unit is configured to send a first drive signal to the first coil through a first inverter to drive the outer rotor and the washing tube operatively connected thereto, and send a second drive signal independently from the first drive signal to the second coil through a second inverter to drive the inner rotor and the pulsator operatively connected thereto.

* * * * *